H. WEGWART.
CONTAINER.
APPLICATION FILED MAY 7, 1919.
1,320,591.
Patented Nov. 4, 1919.
3 SHEETS—SHEET 1.
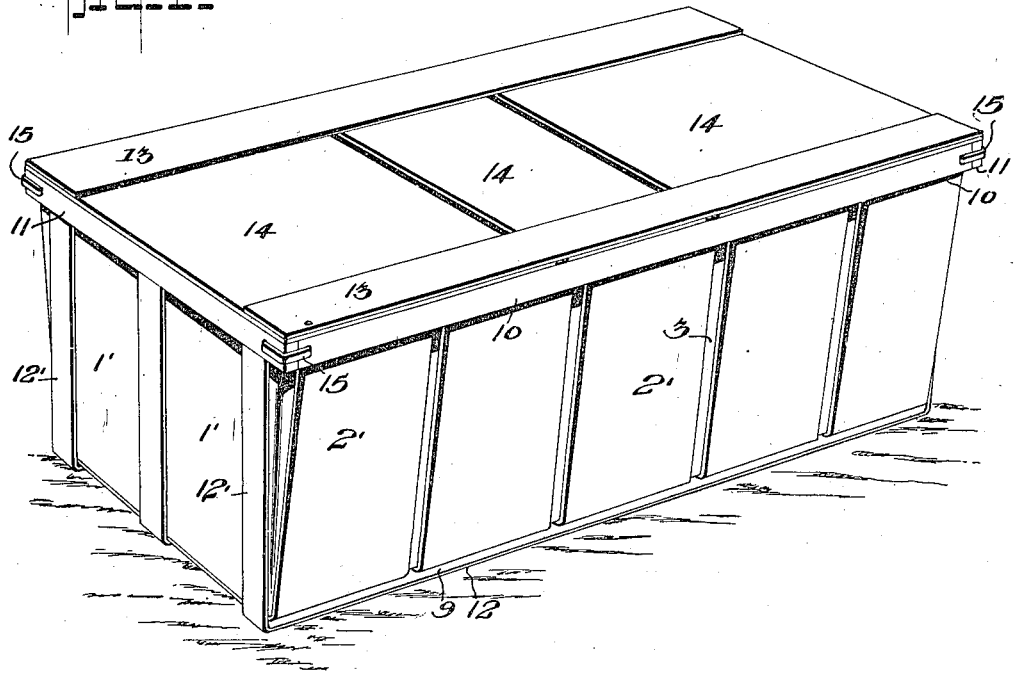
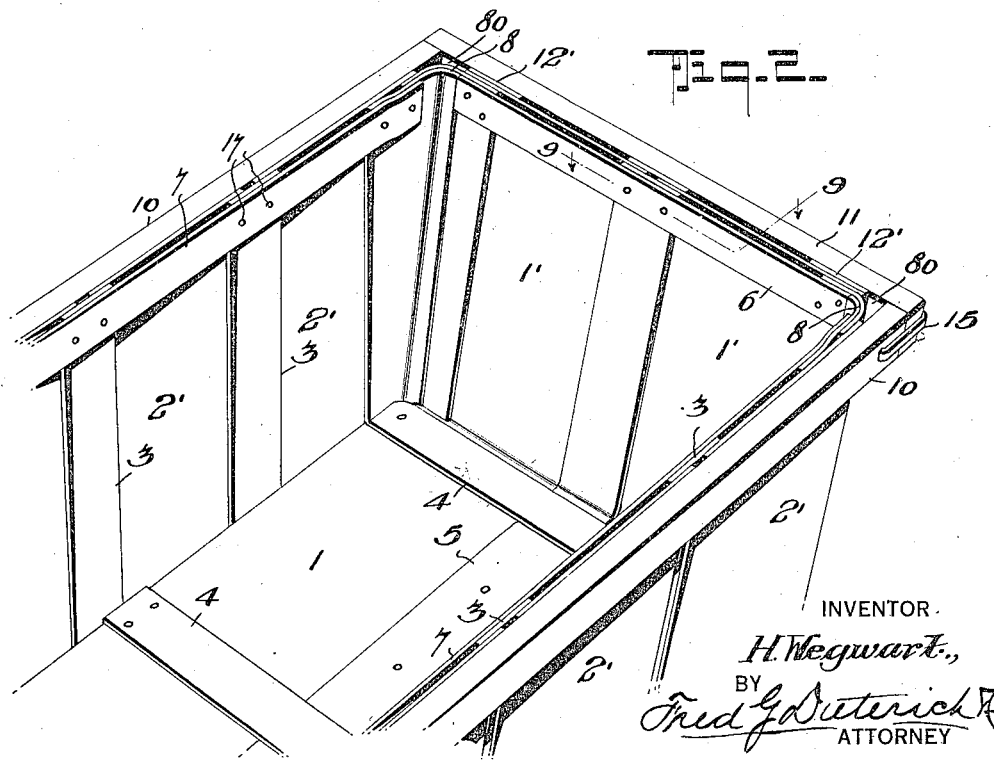
INVENTOR
H. Wegwart,
BY
Fred G. Dieterich
ATTORNEY

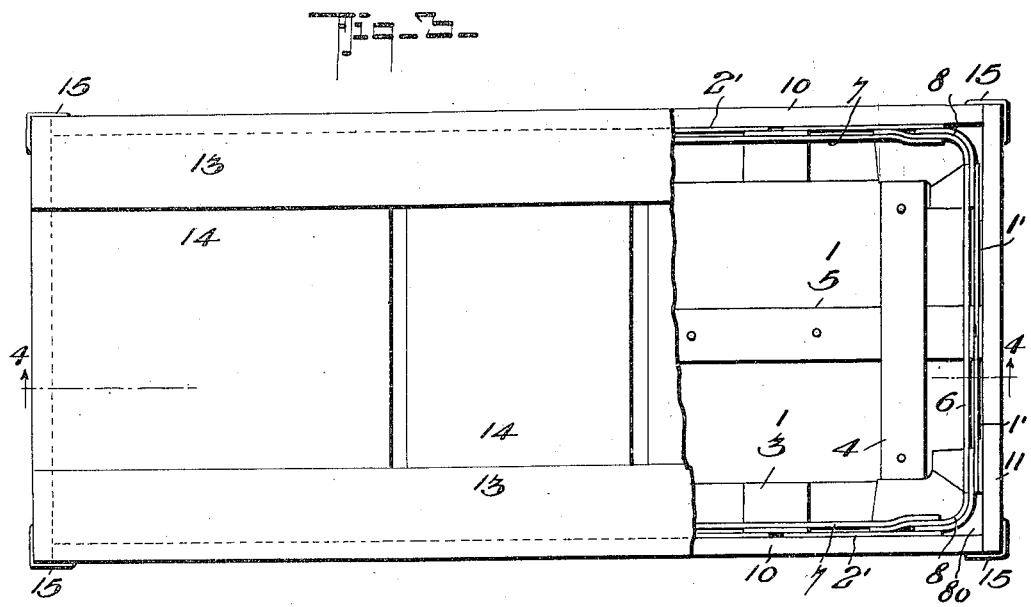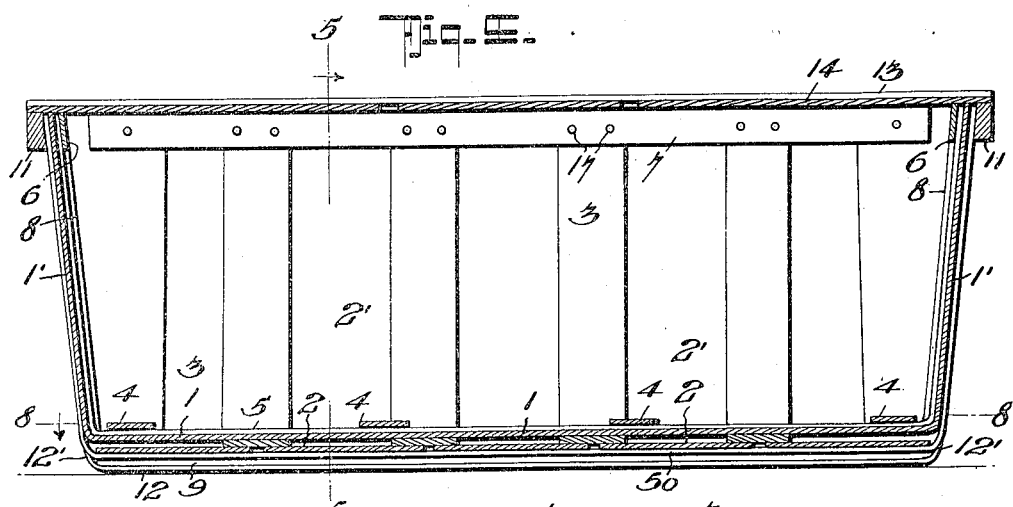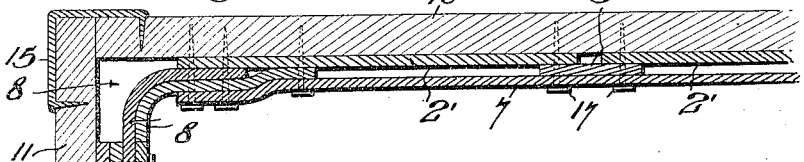

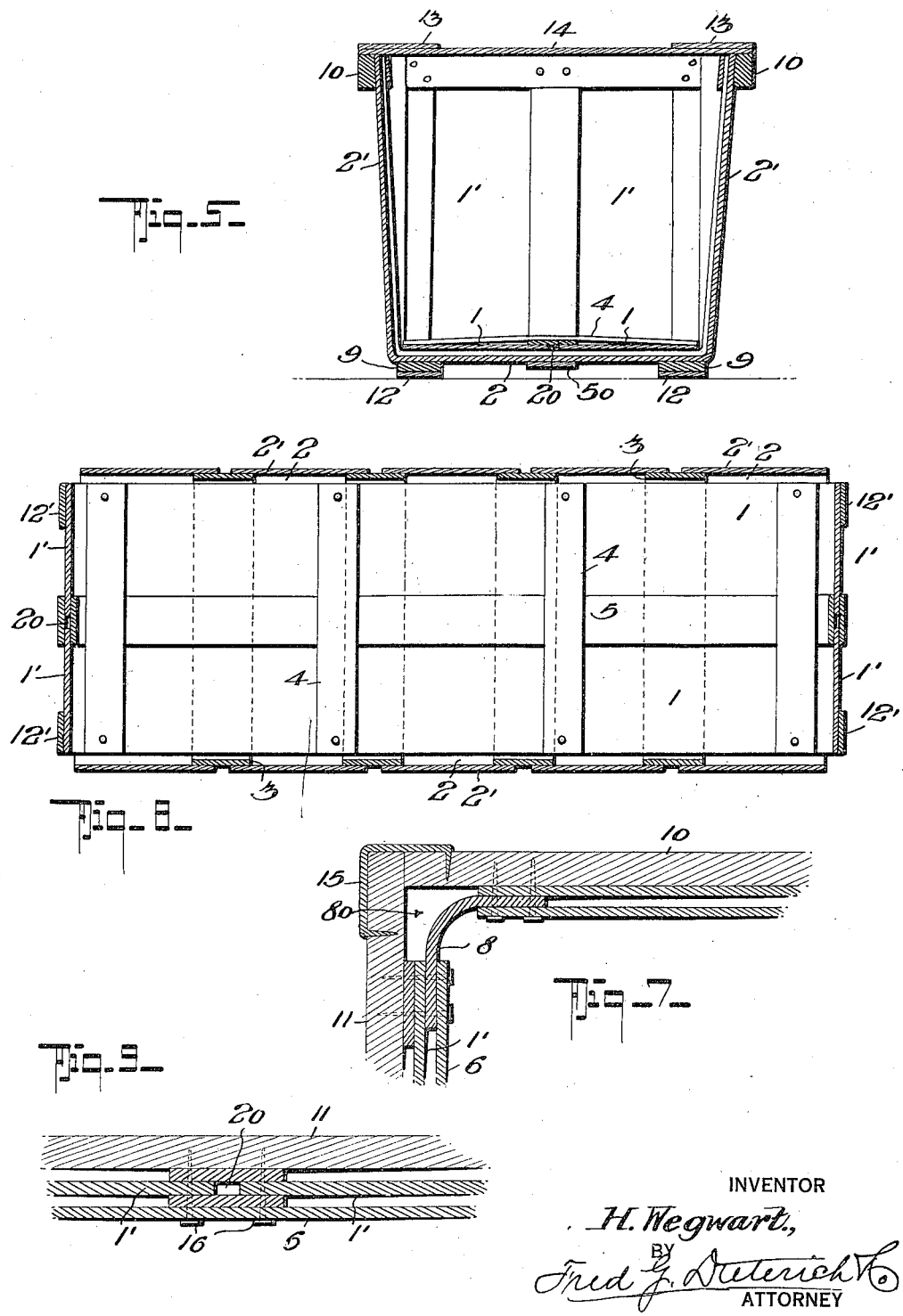

UNITED STATES PATENT OFFICE.

HERMAN WEGWART, OF BURLINGTON, WISCONSIN.

CONTAINER.

1,320,591. Specification of Letters Patent. Patented Nov. 4, 1919.

Application filed May 7, 1919. Serial No. 295,276.

*To all whom it may concern:*

Be it known that I, HERMAN WEGWART, a citizen of the United States, residing at Burlington, in the county of Racine and State of Wisconsin, have invented certain new and useful Improvements in Containers, of which the following is a specification.

My invention relates to improvements in that class of shipping crates, baskets or boxes usually framed up of wood veneer and other bendable material and primarily my said invention has for its purpose to provide a container of the general character referred to that is especially designed as a substitute for nailed boxes as well as wire bound veneer boxes and which is of such a simple and economical construction that it may be manufactured at less cost than any box or container of the type referred to now on the market.

Another object of my invention is to provide a container, of the kind mentioned, adapted for holding and shipping meat and other products and which has its component parts so combined and arranged whereby the complete container is found as especially adapted for meat packing and shipping and which is capable of holding, when made of a standard or preferred size, fifty pounds of meat products, the parts constituting the container being also peculiarly arranged whereby the empty containers may be readily nested within each other for packing and shipping, to thereby effect a considerable saving of storage room and freight costs.

With other objects in view that will hereinafter appear, my invention comprehends an improved container embodying the peculiar features of construction and novel arrangement of parts all of which will be first described in detail and specifically pointed out in the appended claims and illustrated in the accompanying drawings, in which:

Figure 1 is a perspective view of my improved container, the same being shown in the completed shape ready for shipping.

Fig. 2 is a similar view of one end of the container, the top or cover being omitted.

Fig. 3 is a top plan thereof, part of the cover being omitted to the more clearly illustrate the interior arrangement of the parts of which the body of the container is composed.

Fig. 4 is a longitudinal section of the complete container taken practically on the line 4—4 on Fig. 3.

Fig. 5 is a transverse section of the container taken on the line 5—5 on Fig. 4.

Fig. 6 is a horizontal section of one corner of the body of the container.

Fig. 7 is a similar view thereof and illustrates a slightly modified arrangement of the parts.

Fig. 8 is a horizontal section of the complete basket, taken on the line 8—8 on Fig. 4.

Fig. 9 is a detail horizontal section on the line 9—9 on Fig. 2.

In the practical application of my invention, to meet the more essential requirements for shipping products, I make my improved construction of container in different sizes, ranging from twenty-five pounds capacity up to one hundred pounds capacity.

In the drawings, I have shown the constituent parts especially designed and proportioned to provide a container for fifty pounds capacity, it being understood no matter what the size of the container may be, the parts, of which it is composed, remain in relatively the same proportions indicated in the present showing of container.

Referring to the details of construction, the container body is formed of a set of longitudinal veneer pieces 1—1 of uniform length and width.

The said pieces 1—1 constitute bottom members and their opposite ends are bent up to form the end portions 1' of the container, which, when the parts are assembled to produce the container body, have their upper ends secured to the cross or end members 11—11 of a rectangular top rim that includes the side pieces 10—10, the opposite ends of which are secured to the corresponding ends of the members 11—11 by metal strip fasteners 15—15, as clearly shown in the drawings.

The rim members 11 and 10 are composed preferably of one by one and one-half inch wood strips.

6—6 designate combined reinforcing and tie strips of thin veneer and they are secured over the upper ends of the portions 1' that are fastened to the wooden strips 11 by nails 16 which are driven through the bands or strips 6, through the portions 1' and into the cross strips 11—11 of the top or rim frame, as shown.

A series of veneer pieces or strips 2 of uniform length and width coöperate with the longitudinal strips 1 and they are placed crosswise of and extend under the bottom portions of the said strips 1—1, as is best shown in Fig. 4, by reference to which it will be also observed that the opposite ends of the pieces 2—2 are bent up to form the side members 2'—2' of the container, the upper ends thereof being secured to the inner face of the side pieces 10—10 of the top or rim frame to which they are made fast by nails 17 that are driven through binder strips 7—7, also of thin veneer, and into the side pieces 10—10, as shown.

When assembling the pieces 1—1' the bottom and ends with the pieces 2—2' that constitute the bottom and side portions of the container, the said pieces 1 and 2 are spaced apart and the spaces 20 between the pieces 1 are closed and the inner adjacent edges of the said pieces 1—1' are reinforced by thin veneer bands 5 and 50, one of which, 5, engages the upper face of the bottom portions of the strips 1 and the inner face of the end portions of the said strips 1, while the other band, 50, extends over the bottom and outer faces of the said pieces 1, see Fig. 3.

The ends of the tie bands 5 and 50 are secured to the band 6 and the rim members 11—11, and the band 50, before referred to, also passes under and across the bottom portions of the transverse strips or pieces 2.

3—3 designate wooden veneer bands or strips and they extend across the inside of the container body and constitute closures for the spaces between the cross pieces 2—2. The upper ends of the strips 3—3 are secured to the side members 10—10 by nailing through the said upper ends and through the reinforcing and clamping bands or strips 7—7, see Fig. 6, by reference to which it will also be observed that the members 3 cross under the bottom portions of the strips 1—1.

Other cross strips 4—4 are nailed onto the bottom portions of the strips 1—1 and over the upper longitudinal band 5.

By forming the bottom, sides and ends of the container body of veneer strips, as shown and described, a strong and compact assemblage of the said parts (which include a substantially solid bottom) is provided, it being understood that by securing the upper ends of the end portions of the longitudinal pieces 1—1, and the side portions of the cross pieces 2—2 to an upper rectangular solid rim or top frame, and reinforcing the said pieces 1 and 2 at their intervening spaces by the reinforcing bands and attaching the ends of the said bands to the said top frame, as stated, the sides and ends of the container are maintained in a rigid relation with respect to the bottom, especially when the container has a maximum filling and is ready for shipment.

As a further means for rendering the body sufficiently rigid to withstand the usual knocks, when lifting the container from place to place during shipment and otherwise handling the same, solid wooden strips 9 are placed on the bottom along the opposite longitudinal edges thereof and the said strips are held in place by veneer bands or strips 12—12 which pass under the strips 9 and have their ends 12'—12' bent upwardly over the ends 1' of the members 1 and are secured to the cross pieces 11 of the top or rim frame.

The bands 12 and the strips 9—9 are secured to each other and to the container body by nails that are driven through the members 9 and 12 and into the said container bottom.

For closing the openings 80 at the corners of the container, a pair of veneer strips 8 are provided for each corner whose adjacent edges overlap and are secured, at their upper ends, by nailing the meeting ends of the end and side bands or strips 6 and 7 over the said upper ends and to the meeting corners of the end and side top frame members 10 and 11.

The object of providing two pieces 8, at each corner, and overlapping the said pieces is to provide for the natural expansion of the corner openings and to overcome a break in the closures for the said corner spaces which might occur were the end closure members each composed of a single piece of veneer, as is illustrated in Fig. 7, it being, however, understood that, when the containers are of the smaller sizes, the end pieces may be a single member, as shown in the said Fig. 7.

By forming the top or rim frame of solid wooden strips 10 and 11, as shown and described, the same, in addition to constituting a rigid top edge for the container and a means for readily and economically securing the upper ends of the side and end portions of the cross strips 1 and 2, it also affords a suitable means for securing the top of the container, which top, in my complete construction of container, comprises a number of spaced wooden veneer cross pieces 14 and a pair of longitudinal veneer strips 13 that are nailed across the outer ends of the pieces 14.

The rectangular top or rim frame, when applied to the container, is secured thereon by nailing the outer edges of the said top onto the rectangular frame, as shown.

By connecting the longitudinal and cross strips 1 and 2 to a rigid top frame and to the solid wooden bottom strips 9—9, and combining therewith the longitudinal and transverse reinforcing veneer bands, as shown, the parts will not easily become separated and, should any of the pieces 1 and 2, split, the container body will be still held to the desired shape for properly holding the contents from falling out.

Another advantage in the use of a container constructed as hereinbefore stated, is that it can be the more efficiently filled and closed than is possible with the usual forms of shipping boxes or crates used for similar purposes and, since the tops can be shipped in flat packs and the containers in nested packs, a great saving in shipping the container from the factory to the consumer as well as a saving on the freight items, is effected.

My container, in its complete shape, weighs much less than a nailed or wire bound box of the like size and yet is sufficiently strong to meet the shipping requirements.

What I claim is:

1. A container constructed of a series of longitudinal pieces and a series of cross pieces of wood veneer, the longitudinal pieces resting upon the cross pieces, the contacting portions of the crossed pieces constituting the bottom of the container, the ends of the said crossed pieces being bent up to form the sides and ends of the container, a rigid wood rim frame consisting of side and end portions that overlap the extreme ends of the sides and ends of the container body, means for securing the said extreme ends onto the inner face of the rim frame and a top adapted for being nailed onto the said rigid rim frame, longitudinal and transverse veneer bands that engage the adjacent inside edges of the said longitudinal and transverse body pieces, the said bands constituting closures for the spaces between the said body pieces, the said crossed bands having their ends bent up and their extremities engaging the inner face of the rim frame, and means for securing the said extremities to the crossed body strips and the frame.

2. A container constructed of a series of longitudinal pieces and a series of cross pieces of wood veneer, the longitudinal pieces resting upon the cross pieces, the contacting portions of the crossed pieces constituting the bottom of the container, the ends of the said crossed pieces being bent up from the sides and ends of the container, a rigid wood rim frame consisting of side and end portions that overlap the extreme ends of the sides and ends of the container body, means for securing the said extreme ends onto the inner face of the rim frame and a top adapted for being nailed onto the said rigid rim frame, longitudinal and transverse veneer bands that engage the adjacent inside edges of the said longitudinal and transverse body pieces, the said bands constituting closures for the spaces between the said body pieces, the said crossed bands having their ends bent up and their extremities engaging the inner face of the rim frame, and means for securing the said extremities to the crossed body strips and the frame, 70 the said means including longitudinal veneer strips that are nailed over the said extremities of the longitudinal and transverse bands and the upper ends of the crossed body strips.

3. A container constructed of a series of longitudinal and transverse pieces of wood veneer that crosswise engage and form the bottom portion of the container body, a rigid wood frame of somewhat greater width and length than the bottom portion, whereby, when the parts are assembled, a tapering body is formed to provide for nesting said bodies for storing and shipping, the ends of the crossed veneer pieces being bent up to form the sides and ends of the body and means for securing said ends of the crossed pieces to the inner face of the rim frame, the latter forming a solid bearing on which to nail a top, transverse veneer bands that fit onto the inner face of and over the space between the cross strips, and longitudinal veneer bands that fit over the spaces between the aforesaid longitudinal pieces, the transverse bands engaging the under side of the bottom portions of the longitudinal pieces, and means for securing the extremities of the said longitudinal and transverse veneer bands onto the rim frame.

4. A container constructed of a series of longitudinal and transverse pieces of wood veneer that crosswise engage and form the bottom portion of the container body, a rigid wood frame of somewhat greater width and length than the bottom portion, whereby, when the parts are assembled, a tapering body is formed to provide for nesting said bodies for storing and shipping, the ends of the crossed veneer pieces being bent up to form the sides and ends of the body and means for securing said ends of the crossed pieces to the inner face of the rim frame, the latter forming a solid bearing on which to nail a top, transverse veneer bands that fit onto the inner face of and over the space between the cross strips, and longitudinal veneer bands that fit over the spaces between the aforesaid longitudinal pieces, the transverse bands engaging the under side of the bottom portions of the longitudinal pieces, and means for securing the extremities of the said longitudinal and transverse veneer bands onto the rim frame, and other veneer bands that fit over the bottom and the ends of the container body, the extremities of the said other veneer bands being extended over the inner face of the end members of the rim frame, and means for securing the said extremities to the said frame.

5. A packing and shipping container constituted of the following elements; a series of longitudinal and a series of transverse wood veneer strips that cross and engage one another to form the bottom of the container, the opposite ends of the said crossed strips being bent up to form the sides and the ends of the container body, solid wood pieces secured along the longitudinal bottom edges of the container, closure bands of wood veneer along the inside of the body over the adjacent meeting ends of the side and end members of the said body, an inner and an outer longitudinal band that fits over the spaces between the longitudinal body strips, other longitudinal veneer bands that fit over the solid wood pieces under the bottom of the said body, a rim frame that fits over the upper extremities of the said side and end body strips and the side and end closure bands, and means for securing the extremities of all of the aforesaid veneer pieces against the inner face of the top rim.

6. A packing and shipping container constituted of the following elements; a series of longitudinal and a series of transverse wood veneer strips that cross and engage one another to form the bottom of the container, the opposite ends of the said crossed strips being bent up to form the sides and the ends of the container body, solid wood pieces secured along the longitudinal bottom edges of the container, closure bands of wood veneer along the inside of the body over the adjacent meeting ends of the side and end members of the said body, an inner and an outer longitudinal veneer band that fits over the spaces between the longitudinal body strips, other longitudinal veneer bands that fit over the solid wood pieces under the bottom of the said body, a rim frame that fits over the upper extremities of the said side and end body strips and the side and end closure bands, and means for securing the extremities of all of the aforesaid veneer pieces against the inner face of the top rim, the said means including horizontal clamping bands or strips of wood veneer that fit over the said extremities of the veneer bands and through which nails that secure the parts to the rim frame are driven.

7. A packing and shipping container constituted of the following elements; a series of longitudinal and a series of transverse wood veneer strips that cross and engage one another to form the bottom of the container, the opposite ends of the said crossed strips being bent up to form the sides and the ends of the container body, solid wood pieces secured along the longitudinal bottom edges of the container, closure bands of wood veneer along the inside of the body over the adjacent meeting ends of the side and end members of the said body, an inner and an outer longitudinal veneer band that fits over the spaces between the longitudinal body strips, other longitudinal veneer bands that fit over the solid wood pieces under the bottom of the said body, a rim frame that fits over the upper extremities of the said side and end body strips and the side and end closure bands, and means for securing the extremities of all of the aforesaid veneer pieces against the inner face of the top rim, the said means including horizontal clamping bands or strips of wood veneer that fit over the said extremities of the veneer bands and through which nails that secure the parts to the rim frame are driven, and wood veneer members that close the openings at the corners of the container body, the said members having their opposite edges extended between and secured by the adjacent ends of the side and end horizontal clamping bands.

8. A packing and shipping container constituted of the following elements; a series of longitudinal and a series of transverse wood veneer strips that cross and engage one another to form the bottom of the container, the opposite ends of the said crossed strips being bent up to form the sides and the ends of the container body, solid wood pieces secured along the longitudinal bottom edges of the container, closure bands of wood veneer along the inside of the body over the adjacent meeting ends of the side and end members of the said body, an inner and an outer longitudinal veneer band that fits over the spaces between the longitudinal body strips, other longitudinal veneer bands that fit over the solid wood pieces under the bottom of the said body, a rim frame that fits over the upper extremities of the said side and end body strips and the side and end closure bands, and means for securing the extremities of all of the aforesaid veneer pieces against the inner face of the top rim, the said means including horizontal clamping bands or strips of wood veneer that fit over the said extremities of the veneer bands and through which nails that secure the parts to the rim frame are driven, and wood veneer members that close the openings at the corners of the container body, the said members having their opposite edges extended between and secured by the adjacent ends of the side and end horizontal clamping bands, the said closure members each being composed of two overlapping pieces.

9. A container composed of transverse and longitudinal wood veneer pieces, portions of the said pieces engaging one another and constituting the bottom of the container, the other portions of said longitudinal and transverse pieces being bent up to form the ends and the sides of the container, a rigid wood frame that constitutes the upper rim of the body, and against the inner face of which the upper extremities of the side and end pieces bear, a pair of longitudinal wood veneer bands, one of which engages the upper face of the longitudinal pieces and the other of which engages the under face of such pieces, the said bands also constituting reinforcing elements, and means for securing the extremities of the said bands onto the inner face of the rim frame, the said means including a clamping band that extends over the said extremities and nails that pass through the said clamping bands, the ends of the longitudinal bands, the ends of the longitudinal pieces and into the rim frame.

HERMAN WEGWART.